US006972269B1

(12) United States Patent
Beretta

(10) Patent No.: US 6,972,269 B1
(45) Date of Patent: Dec. 6, 2005

(54) NET-LIKE STRUCTURE PARTICULARLY FOR GEOTECHNICAL USES

(75) Inventor: Mario Beretta, Sirtori (IT)

(73) Assignee: Tenax S.P.A., Vigano (IT)

( * ) Notice: Subject to any disclaimer, the term of this patent is extended or adjusted under 35 U.S.C. 154(b) by 0 days.

(21) Appl. No.: 09/523,708

(22) Filed: Mar. 13, 2000

(30) Foreign Application Priority Data

Apr. 7, 1999 (IT) .............................. MI99A0714

(51) Int. Cl.[7] ............................. D04G 1/00; B32B 27/12
(52) U.S. Cl. ............................. 442/1; 442/205; 428/86; 428/119; 245/1; 405/284
(58) Field of Search .......................... 442/205; 428/86, 428/119; 245/1; 405/284

(56) References Cited

U.S. PATENT DOCUMENTS

| | | | | |
|---|---|---|---|---|
| 4,572,700 A | * | 2/1986 | Mantarro et al. | .............. 404/35 |
| 5,651,641 A | * | 7/1997 | Stephens et al. | ............ 405/258 |

* cited by examiner

*Primary Examiner*—Glenn Caldarola
*Assistant Examiner*—Alexis Wachtel
(74) *Attorney, Agent, or Firm*—Guido Modiano; Albert Josif; Daniel O'Byrne

(57) ABSTRACT

A net-like structure particularly for geotechnical applications which comprises a first and a second layer which are mutually spaced and joined one another by spacers which are co-extruded together with the layers. At least one of the layers comprises at least one set of yarns arranged at one end of the spacers; the spacers have a reduced transverse cross-section.

10 Claims, 2 Drawing Sheets

NET-LIKE STRUCTURE PARTICULARLY FOR GEOTECHNICAL USES

BACKGROUND OF THE INVENTION

The present invention relates to a net-like structure particularly for geotechnical uses.

It is known that geotechnical applications currently use perforated sheets or grids which are appropriately calendered or thermoformed so as to have protrusions or studs on their surface; another solution entails manufacturing nets with two or more sets of yarns or optionally manufacturing grid-like products which have, on one face, a plurality of spacer studs which have a free end.

The products according to the prior art are not always up to their tasks, since for example continuous or perforated sheets shaped by calendering or molding have the drawback that they are fragile and easily compressible due to the internal weakness of the resulting protrusions.

It is not advisable to use such sheets as draining products due to the excessive presence of relatively large spacing materials, which are furthermore subjected to gradual compression under stress, so that the studs ultimately become compressed and decrease in thickness, consequently reducing the drainage capacity.

If fabrics are coupled to conventional products, since the studs are relatively spaced, the geotextile product sinks in the points where it is not bonded.

Another problem is that the calendering of grid-like or perforated material can be performed only starting from material which has small openings, in order to avoid compromising the strength of the structure and its production, accordingly reducing the drainage capacity of the product.

When using two or more layers of yarns, the draining function is rendered less efficient by the presence of transverse yarns along the path of the fluid which in practice hinder the free flow of liquids.

Furthermore, the products according to the prior art, when not bonded to membranes and/or fabrics, due to their non-laminar structure, may damage or bite into delicate surfaces such as those of the linings or membranes that are superimposed thereon.

When using grid-like products with studs, such studs, when subjected to intense compression, can perforate the delicate surfaces with which they are in contact.

SUMMARY OF THE INVENTION

The aim of the invention is to eliminate the above drawbacks, by providing a net-like structure particularly for geotechnical applications which has spacer elements having excellent resistance to compression without however having large cross-sections which may hinder the useful passage sections between the two faces of the structure.

Within the scope of this aim, an object of the invention is to provide a product which can be used advantageously both in spacing and in drainage systems.

Another object of the present invention is to provide a net-like structure which avoids the possibility of damage to the surrounding surfaces and furthermore allows stable connection to any geotextile layers connected in large regions of the net-like structure.

Another object of the present invention is to provide a net-like structure which thanks to its particular constructive characteristics is capable of giving the greatest assurances of reliability and safety in use and is also competitive from a purely economical point of view.

This aim, these objects and others which will become apparent hereinafter are achieved by a net-like structure particularly for geotechnical applications, according to the invention, comprising a first and a second layer which are spaced one another and joined by spacers which are co-extruded together with said layers, at least one of said layers being constituted by at least one set of yarns arranged at one end of said spacers.

BRIEF DESCRIPTION OF THE DRAWINGS

Further characteristics and advantages will become apparent from the description of preferred but not exclusive embodiments of a net-like structure particularly for geotechnical applications, illustrated only by way of non-limitative example in the accompanying drawings, wherein.

DESCRIPTION OF THE PREFERRED EMBODIMENTS

Figure 1:
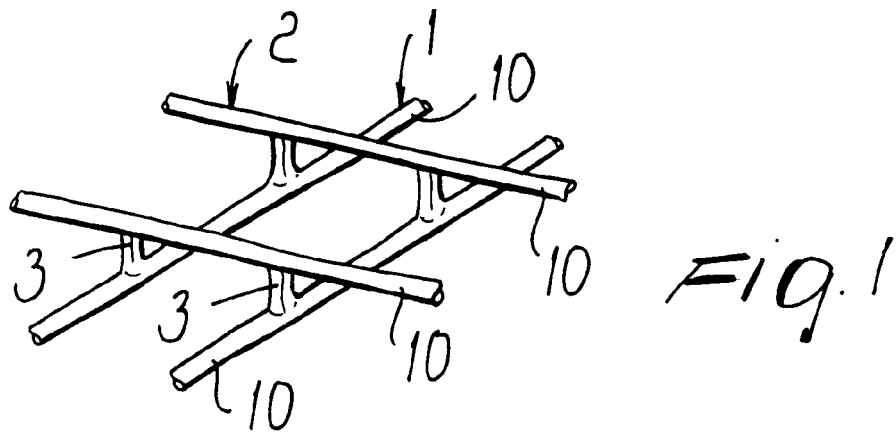
FIG. 1 is a schematic perspective view of a net-like structure according to the present invention in which the two layers are both formed by a set of yarns.

With reference to the above figures, the net-like structure particularly for geotechnical applications according to the invention comprises a first layer, generally designated by the reference numeral 1, and a second layer, generally designated by the reference numeral 2, which are spaced one another and joined by spacers 3 which are co-extruded with such layers.

The solution idea that is the basis of the invention is to provide spacers 3 which have a reduced cross-section, have a variable shape according to the intended applications and join the two layers 1,2 so as to give the structure used as a spacer a resistance to compression which is proportionate to the pressure applied thereto, obtaining, in drainage systems, high-level drainage properties which remain unchanged even when the product is subjected to compression.

The types of the layers can be provided in various manner; thus, for example, as shown in FIG. 1, both layers 1,2 are provided by means of a first set of yarns, designated by the reference numeral 10, which are arranged in a parallel configuration on the various layers and are arranged in directions which are mutually substantially parallel for the sets of each individual layer 1,2 and transverse with respect to the set of yarns provided on the other layer 1,2.

Figure 2:
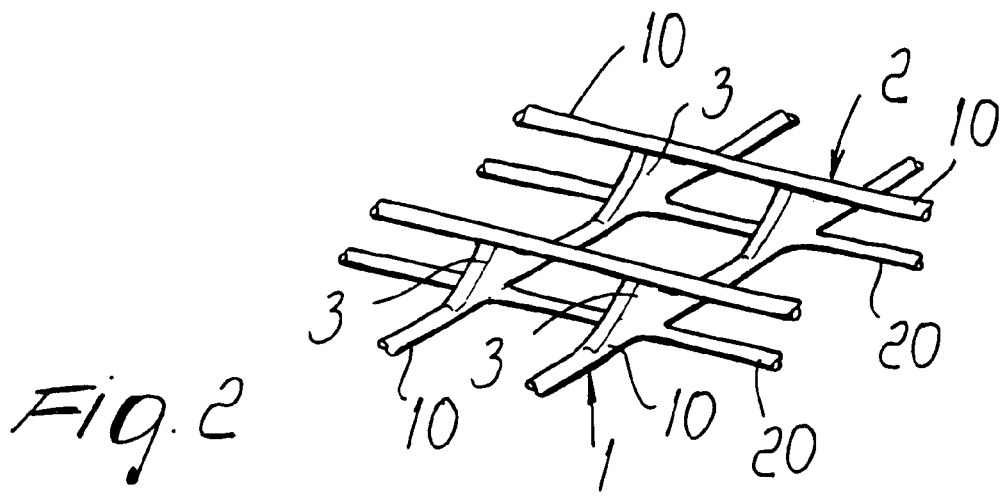
FIG. 2 is a perspective view of the net-like structure according to the invention, with a layer formed by a grid-like element.

According to FIG. 2, one of the layers, for example the first one 1, is formed by means of a grid-like element, designated by the reference numeral 20, from which the spacers 3 protrude, connecting the other layer 2, which is constituted by a set of yarns again designated by the reference numeral 10.

The spacers 3, which are constituted by studs, can be provided at the nodes of the grid-like structure or optionally at any point of the grid-like element, without altering the fact that the studs must end in the yarns that constitute the second layer 2.

The spacers 3 can have a variable cross-section according to the application and to the pressures to which they are subjected.

Figure 3:
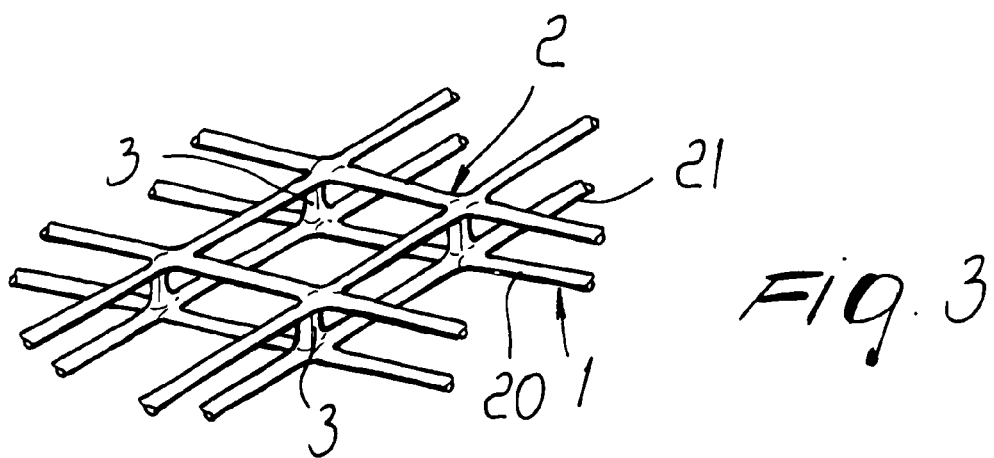
FIG. 3 is a view of a net-like structure with both layers formed by means of grid-like elements.

FIG. 3 illustrates a structure in which the first layer 1 is provided by means of the grid-like element 20 and the second layer 2 is provided by means of a second grid-like element 21; in this case also, the two grid-like elements are joined by studs which can be distributed both at the nodes or crossing points of the grid-like elements 20 and at any other point.

Figure 4:
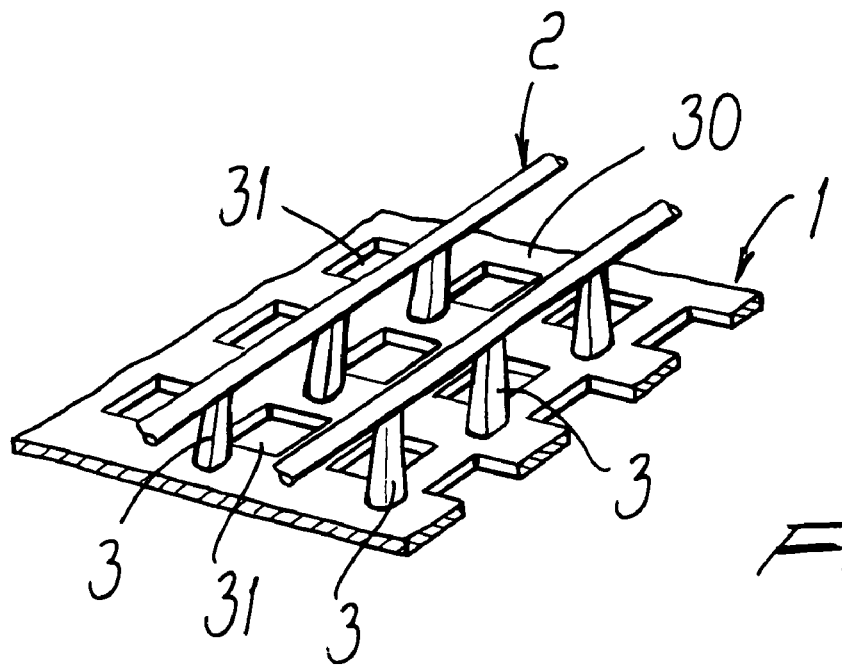
FIG. 4 is a view of a net-like structure with one layer formed by a sheet-like element.
Figure 5:
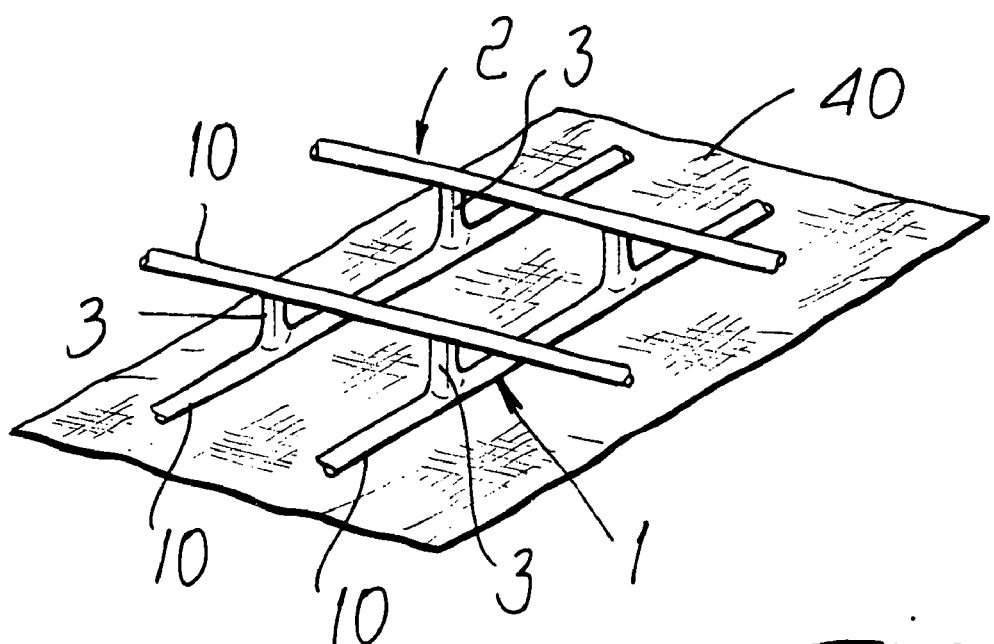
FIG. 5 is a schematic view of the bonding of a geotextile element to the net-like structure.

One of the layers, for example the first one 1, as shown in FIG. 4, can be provided by means of a sheet-like element 30 from which the studs 3 protrude and merge into the second layer 2, which is constituted for example by a set of yarns.

Openings 31 can be formed on the sheet-like element 30, thus forming in practice an open structure which considerably facilitates drainage, or the sheet-like element can be devoid of openings if an impermeable surface is required.

The resulting structure allows to easily bond geotextile fabrics, designated by the reference numeral 40, significantly increasing the contact surface, which provides a more stable bonding of the geotextile and the structure; sagging of the fabric that does not undergo the process of inclusion between the studs is thus avoided, and the drainage and filtration properties of the structure are left unchanged.

It is also possible to apply two layers of fabric or a layer of fabric and a layer of lining.

The presence of two layers of yarns spaced one another makes the structure very solid from a mechanical viewpoint, avoiding deformation or damage to the product, but on the other hand allows the structure to easily adapt to the surfaces to which it is applied, by the fact that the structure is relatively soft.

The studs used have dimensions and shapes which can vary according to the applications for which the product is intended without altering the fact that the connection provided between the two layers considerably increases resistance to compression and avoids the folding of the studs.

The net-like structure also allows, thanks to a stud which has a reduced horizontal cross-section and a height which can vary according to requirements, to achieve the passage of liquids and gases without forming an obstacle to their drainage in a longitudinal and transverse direction.

The studs, as already mentioned, can be arranged in various manners according to requirements and applications, as the extrusion system allows to provide a higher or lower density of studs and it is possible to arrange the studs at the nodes or junctions of the meshes of the grid-like elements or along the yarns thereof.

In particular, the arrangement of the stud at the intersection of the yarns is provided when one wishes to ensure higher compression resistance of the structure.

From the above description it is thus evident that the invention achieves the intended aim and objects, and in particular the fact is stressed that the net-like structure according to the invention can be used effectively in systems designed to provide protection, spacing and high drainage.

Furthermore, the net-like structure according to the invention, both in the case of the grid-like form and in the case of the continuous or perforated membrane, can be shaped and folded easily while maintaining a high concentration of studs; this allows to use a high-performance product even in the presence of nonlinear surfaces where a high degree of adhesion is required.

The invention thus conceived is susceptible of numerous modifications and variations, all of which are within the scope of the inventive concept.

Thus, for example, the shape of the yarns and their concentration can vary according to the specific use for which the structure is meant; the yarn can be flat or flattened in shape where it is necessary to bond fabric and the number of yarns can be increased where required.

All the details may furthermore be replaced with other technically equivalent elements.

The disclosures in Italian Patent Application No. MI99A000714 from which this application claims priority are incorporated herein by reference.

What is claimed is:

1. A net structure particularly for geotechnical applications, comprising a first and a second layer which are placed next to one another and joined by spacers which are extruded in a single phase together with said layers, at least one of said layers being constituted by at least one set of yarns arranged at one end of said spacers, said spacers having a shape, cross-section and height that vary according to a required compression resistance of said spacers.

2. The net structure according to claim 1, wherein both said first and second layers are formed by a first set of yarns which are parallel to each other, said first set of yarns of the first layer being arranged transversely with respect to the first set of yarns of the second layer, said spacers having ends located respectively at the yarns of one layer and at said yarns of another layer.

3. The net structure according to claim 1, wherein at least one of said first and second layers is formed by means of a grid element.

4. The net structure according to claim 3, wherein said spacers lie at nodes of said grid-like element.

5. The net structure according to claim 3, wherein said spacers protrude from any point of the yarns that constitute said grid-like element.

6. The net structure according to claim 3, wherein said grid-like element is formed by two sets of yarns which mutually intersect.

7. The net structure according to claim 1, wherein both said first and second layers are formed by a grid-like element.

8. The net structure according to claim 1, wherein one of said first and second layers is constituted by a sheet element from which said spacers protrude.

9. The net structure according to claim 8, further comprising through openings in said sheet-like element.

10. The net structure according to claim 1, comprising a geotextile fabric which is attached to at least one of said first and second layers.

* * * * *